United States Patent [19]

MacWilliams

[11] Patent Number: 5,110,003
[45] Date of Patent: May 5, 1992

[54] TORQUE-OVERRIDE CAP

[75] Inventor: Robert MacWilliams, Connersville, Ind.

[73] Assignee: Stant Inc., Connersville, Ind.

[21] Appl. No.: 545,060

[22] Filed: Jun. 28, 1990

[51] Int. Cl.$^5$ .............................................. B65D 53/00
[52] U.S. Cl. ................................. 220/304; 220/288; 220/303; 220/DIG. 33
[58] Field of Search ................ 220/288, 304, DIG. 33, 220/303

[56] References Cited

U.S. PATENT DOCUMENTS

| 4,083,209 | 4/1978 | Sloan, Jr. |  |
|---|---|---|---|
| 4,091,955 | 5/1978 | Sloan, Sr. | 220/203 |
| 4,102,472 | 7/1978 | Sloan, Jr. | 220/295 |
| 4,107,961 | 8/1978 | Evans . |  |
| 4,177,931 | 12/1979 | Evans . |  |
| 4,280,346 | 7/1981 | Evans . |  |
| 4,666,056 | 5/1987 | Kasugai et al. |  |
| 4,678,097 | 7/1987 | Crute . |  |
| 4,726,488 | 2/1988 | Kasugai . |  |
| 4,795,053 | 6/1989 | Kasugai et al. |  |
| 4,854,471 | 8/1989 | Kasugai et al. | 220/288 |
| 4,913,303 | 4/1990 | Harris . |  |

FOREIGN PATENT DOCUMENTS

| 2161374 | 6/1973 | Fed. Rep. of Germany | 220/288 |
| 2206583 | 8/1973 | Fed. Rep. of Germany | 220/288 |

Primary Examiner—Stephen Marcus
Assistant Examiner—Stephen Cronin
Attorney, Agent, or Firm—Barnes & Thornburg

[57] ABSTRACT

A torque-override cap is provided for use in a filler neck of a tank. The cap includes a housing configured to engage the filler neck, a shell for providing a hand grip, and a ratchet wheel and a biasing mechanism disposed between the shell and the housing for providing a driving connection between the shell and the housing. The shell includes a plurality of drive teeth, while the ratchet wheel includes a plurality of driven teeth configured to engage the drive teeth to provide a torque-limited connection in the cap-advancing direction and a positive connection in the cap-removal direction. The biasing mechanism operates to yieldably bias the driven teeth of the ratchet wheel into engagement with the drive teeth of the shell to establish the torque-limited and positive connections.

29 Claims, 3 Drawing Sheets

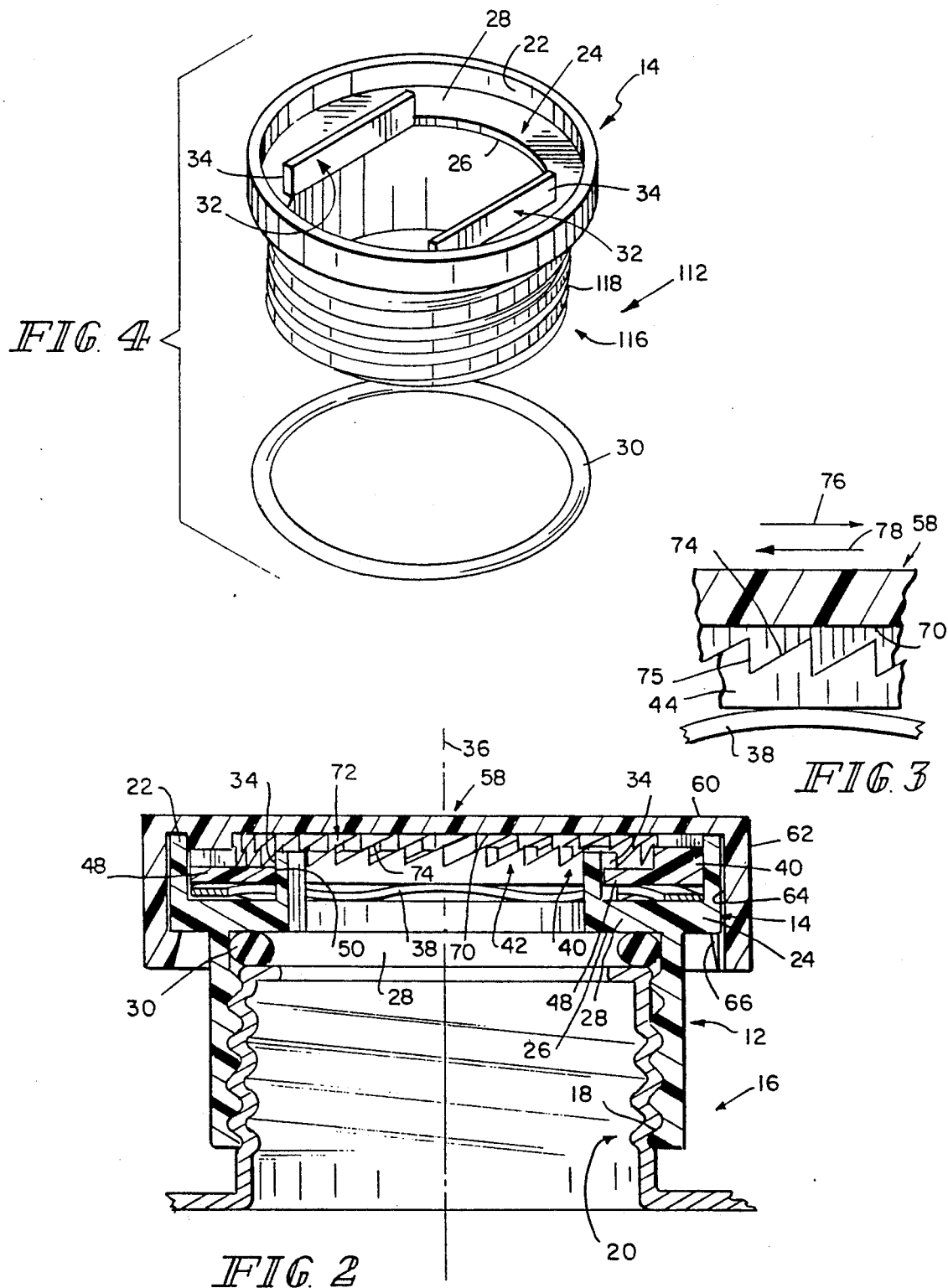

TORQUE-OVERRIDE CAP

BACKGROUND AND SUMMARY OF INVENTION

This invention relates to tank filler neck caps designed to withstand the application of excessive torque. More particularly, the present invention relates to filler neck caps having a ratchet wheel for providing a driving connection between a shell and a housing in such a way that the shell disengages from the housing under the application of excessive torque to the shell.

In recent years, caps configured to be screwed onto fuel tank filler necks have included a torque-control mechanism therein to prevent users from overtightening the cap on the filler neck. Each cap typically includes an O-ring gasket that establishes a fluid and vapor seal between the cap and the filler neck once the cap is mounted properly on the filler neck. Frequent overtightening of a filler neck fuel cap can crush or otherwise damage the O-ring gasket which provides the seal between the cap and the filler neck. The torque-control mechanism was developed to limit the amount of torque which could be applied by a user in the cap-advancing direction as the user rotates the cap on the filler neck to its fully seated filler neck-closing position thereon. Thus, a torque-control mechanism helps minimize wear and tear on the O-ring gasket and preserves the sealing capability of the gasket.

Typically, the torque-control mechanism operates to transmit torque from the outer shell of the cap to the filler neck-engaging closure member of the cap until the closure member is rotated to its fully seated position on the filler neck and the magnitude of the torque begins to exceed a predetermined level. A resilient finger having a pawl tooth at its outer end has been used to engage notches formed in the underside of the outer shell to provide a torque-override driving connection between the outer shell and the closure member as shown, for example, in U.S. Pat. No. 4,913,303 to Harris. See also U.S. Pat. Nos. 4,666,056; 4,726,488; and 4,795,053. Under the application of excess torque to the outer shell, the resilient fingers flex and disengage from the notches in the outer shell to allow the outer shell to rotate relative to the fully seated closure member.

It has been observed that the resilient fingers used in conventional torque-control mechanisms have some shortcomings which can lead to dysfunction of the torque-control mechanism. Typically, these resilient fingers are relatively long and are few in number. Thus, the loading on the pawl of each individual finger is relatively high, contributing to fatigue of the resilient fingers over time. In addition, the resilient fingers may suffer from continuous exposure to high temperature conditions of the type which would be encountered in, for example, a vehicle radiator. The resilient fingers are fashioned of polymeric materials which tend to wear and relax under high temperature conditions. Eventually the resilient fingers become so flexible that they are unable to maintain a driving connection between the ratchet projections and the pawls.

One object of the invention is to provide a filler neck cap having a torque-control mechanism that functions well in a high temperature environment such as in a vehicle cooling system filler neck.

Another object of the invention is to provide a filler neck cap having a torque-control mechanism that is able to withstand repeated application of excessive torque over a long period of time without impairing the driving mechanism in the cap which establishes a driving connection between the outer shell and the closure member during installation and removal of the filler neck cap.

Still another object of the present invention is to provide a torque-override cap having drive teeth designed to maintain sufficient rigidity under high temperature conditions to provide a torque-override function when the cap is rotated about an axis of rotation in a cap-advancing direction.

According to the present invention, a cap for use in closing a filler neck of a tank includes a housing provided with means for engaging the filler neck and shell means for providing a hand grip. The shell means includes a plurality of drive teeth.

The cap further includes a ratchet wheel disposed between the housing and the shell means and connected to the housing for rotation therewith. The ratchet wheel includes a plurality of driven teeth configured to engage the drive teeth. The engagement of the driven teeth and the drive teeth provides a torque-limited connection in the cap-advancing direction and a positive connection in the cap-removal direction.

In preferred embodiments of the present invention, the cap also includes spring means for yieldably biasing the driven teeth of the ratchet wheel into engagement with the drive teeth of the shell means to establish the torque-limited and positive connections. The spring means is illustratively a wavy washer that is positioned in an annular region in the housing to act between the housing and the ratchet wheel to urge the ratchet wheel toward the drive teeth formed on the underside of the shell means.

One feature of a preferred embodiment of the present invention is a ratchet wheel having a number of driven teeth substantially equivalent to the number of drive teeth in the shell means. Advantageously, by providing equivalent numbers of drive teeth and driven teeth, the loading caused by application of torque to the shell means is distributed evenly along the circumference of the ratchet wheel rather than being concentrated in a relatively limited number of resilient fingers. Thus, the fatigue on each individual tooth is minimized.

Another feature of a preferred embodiment of the present invention is a ratchet wheel having a plurality of driven teeth formed of a rigid material. Advantageously, the teeth will maintain rigidity under high temperature conditions so as to maintain a driving connection between the shell means and the housing. Such a ratchet wheel is well-suited for use in a torque-control mechanism to be used in a high temperature environment such as in the filler neck of a vehicle cooling system.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 2 is a transverse sectional detail view of the embodiment of FIG. 1 positioned in engagement with a filler neck;

FIG. 3 is an enlarged sectional view of a portion of the embodiment of FIG. 2 showing drive teeth on a shell portion engaging inclined teeth on a ratchet wheel to provide a torque-limited connection in the cap-advancing direction and a positive connection in the cap-removal direction;

FIG. 4 is a perspective view of an alternative design of a housing member for use in the present invention.

DETAILED DESCRIPTION OF DRAWINGS

Figure 1:
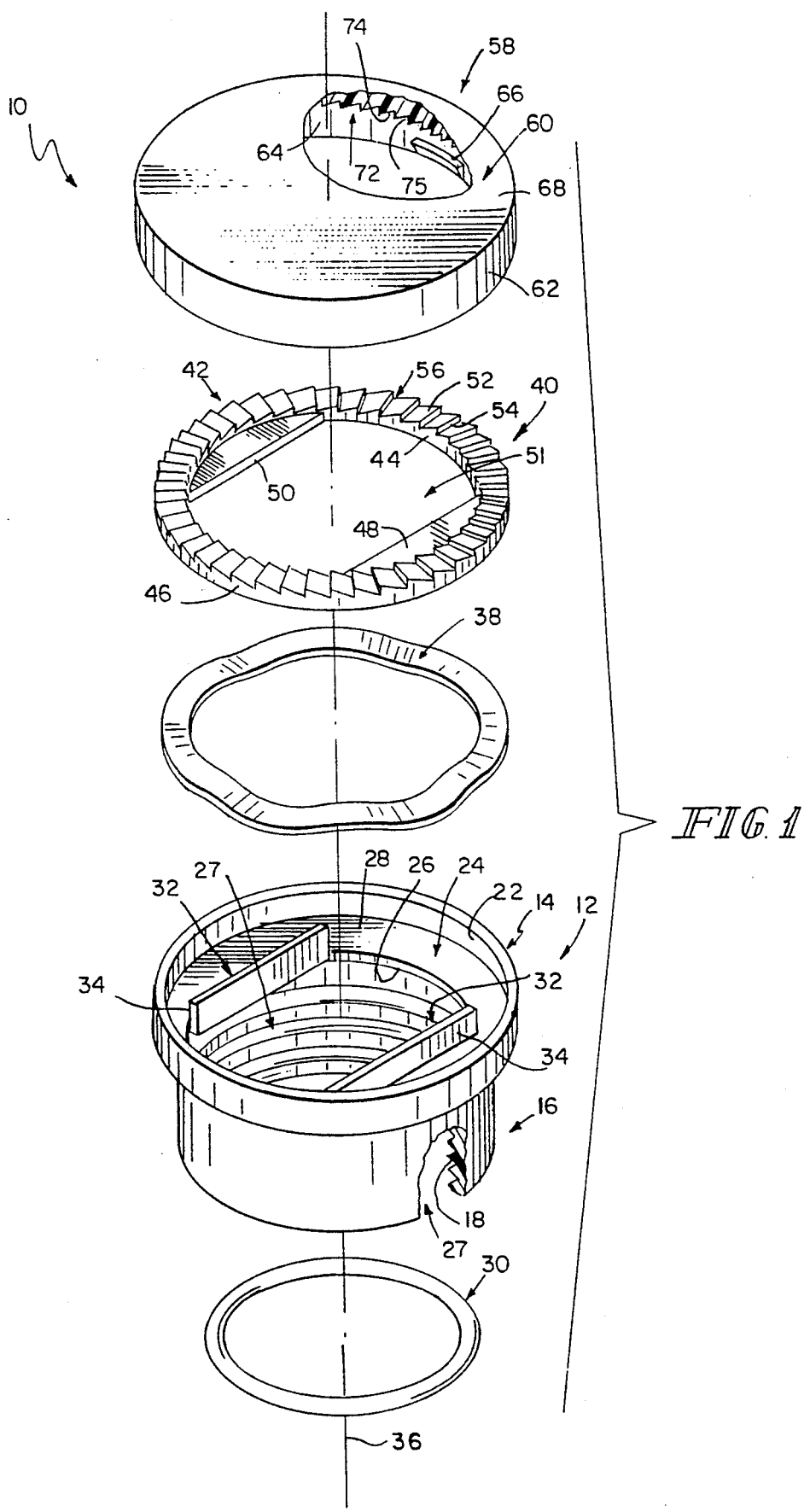
FIG. 1 is an exploded perspective view of an embodiment of a torque-override cap in accordance with the present invention.

An embodiment of a torque-override cap 10 in accordance with the present invention is illustrated in FIG. 1. Cap 10 includes a housing 12 configured to mount on a filler neck 20 and an outer shell 58 configured to provide a hand grip. Housing 12 has an upper portion 14 and a downwardly depending cylindrical portion 16 of smaller diameter than that of upper portion 14. Cylindrical portion 16 includes a plurality of internal threads 18 providing a first engaging means for rotatably engaging filler neck 20 of a fuel tank or radiator (as shown best in FIG. 2).

Referring to FIGS. 1 and 2, upper portion 14 is shown to include axially extending circular rim 22 and radially extending spring support shelf 24. Spring support shelf 24 has an axially downwardly directed face 26 attached to cylindrical portion 16 and an axially upwardly directed face 28 for supporting a spring. An O-ring gasket 30 is positioned in an interior region 27 of cylindrical portion 16 to lie against the downwardly directed face 26. As shown best in FIG. 2, gasket 30 is sized to establish a seal between between cylindrical portion 16 and filler neck 20 when cap 10 is tightened on filler neck 20 to a tight seated position thereon.

Upper portion 14 of housing 12 also includes a pair of upstanding flanges 32 appended to axially upwardly directed face 28 of spring support shelf 24. The flanges 32 lie in spaced-apart parallel relation to frame an interior opening of interior region 27. Upstanding flanges 32 provide faces 34 serving as second engaging means to be engaged and driven to rotate housing 12 with respect to filler neck 20 about an axis of rotation 36 upon manual rotation of the outer shell 58 as described hereinafter.

An annular wavy washer or spring 38 is received on spring support shelf 24 to lie in an annular channel defined between the radially outer circular rim 22 and the radially inner pair of upstanding flanges 32. Wavy spring is typically formed as an undulating flexible ring of rectangular cross-section, although alternative configurations are possible. Wavy spring 38 in turn supports ratchet wheel 40 and acts against the underlying spring support shelf 24 to bias ratchet wheel 40 axially upward with respect to support shelf 24 to establish a driving connection between the threaded housing 12 and the outer shell 58 as described further below.

Ratchet wheel 40 includes a plurality of inclined driven teeth 42 spaced equally about the circumference of ratchet wheel 40 to serve as engaging means to receive torque from outer shell 58 through engagement therewith. Ratchet wheel 40 also includes circular inner side wall 44 facing radially inward and circular outer side wall 46 facing radially outward. A pair of D-shaped drive flanges 48 are appended to circular inner side wall 46 as shown best in FIG. 1. Each includes a drive face 50 extending along a chord of circular inner side wall 44. Drive faces 50 are positioned such that when cap 10 is assembled, drive faces 50 serve as additional engaging means, lying adjacent to driven faces 34 for engagement therewith (as shown best in FIG. 2).

In the illustrated embodiment, drive faces 50 are situated in spaced-apart parallel relation to define a central opening 51 therebetween. The upstanding flanges 32 extend upwardly through the central opening 51 in the ratchet wheel 40 to cause each drive face 50 to lie adjacent to one of the driven faces 34. Thus, when an operator applies torque to rotate cap 10 manually about axis 36, drive faces 50 on the ratchet wheel 40 engage driven faces 34 on the housing 12 to communicate torque from ratchet wheel 40 to housing 12.

It will be understood that in alternative embodiments, the number of drive flanges may be varied. For example, another pair of D-shaped drive flanges may be added, along with corresponding upstanding flanges providing driven faces. In addition, drive face 50 need not necessarily be linear, but may be designed in a variety of alternative configurations. In each case, each upstanding flange 32 is shaped to mate in driving engagement with each drive flange 50.

Driven teeth 42 on ratchet wheel 40 each include an inclined face 52 and an upright face 54. Each upright face 54 cooperates with the inclined face 52 of the next adjacent tooth 42 to define an interdental pocket 56.

Advantageously, drive teeth 42 are formed of a rigid material substantially resistent to normal temperature effects. Thus, driven teeth 42 are designed to maintain a driving connection in engagement with shell 58 even after repeated exposure to high temperatures. This is in contrast to conventional devices including flexible driven teeth, which teeth tend to exhibit excess flexure after repeated operation at high temperatures.

Cap 10 also includes outer shell 58 formed to include a plurality of drive teeth 72 serving as engaging means for propelling the ratchet wheel 40 about axis of rotation 36. Shell 58 includes a radially extending top portion 60 and an axially depending peripheral skirt 62. Peripheral skirt 62 includes a radially inwardly facing circular inner wall 64. A plurality of circumferentially spaced, radially inwardly-extending retainer flanges 66 is appended to inner wall 64. As shown best in FIG. 2, retainer flanges 66 are positioned at the axially inner end of peripheral skirt 62 to engage the outer edge of the downwardly directed face 26 when cap 10 is assembled so that outer shell 58 is retained on housing 12 and is rotatable relative to the housing 12.

Top portion 60 includes an axially upwardly facing outer face 68 and an axially downwardly facing inner face 70. A plurality of inclined drive teeth 72 depend from inner face 70 to project downwardly toward the interdental pockets 56 formed in ratchet wheel 40. These drive teeth 72 are arranged in a ring about the circumference of inner face 70 to mate with the ring of driven teeth 42 provided on the ratchet wheel 40. Advantageously, the number of driven teeth 42 on ratchet wheel 40 corresponds to the number of drive teeth 72 on shell 58. Thus, loading is distributed equally over the circumference of the ratchet wheel, assisting in minimizing fatigue of the teeth 42, 58.

Drive teeth 72 each have inclined faces 74 angled to engage driven teeth 42 on ratchet wheel 40. Drive teeth 72 are each also provided with upright faces 75. As shown in FIG. 2, drive teeth 72 are sized to project into interdental pockets 56 so as to lie in torque-transmitting engagement with driven teeth 42.

In use, an operator wishing to replace cap 10 on filler neck 20 grasps outer shell 58 and applies torque thereto in a cap-advancing direction designated by arrow 76 in FIG. 3. Torque is transmitted to ratchet wheel 40 by the engagement of drive teeth 72 against driven teeth 42 on ratchet wheel 40. Wavy spring 38 biases ratchet wheel 40 toward inner face 70 of outer shell 58, thus biasing driven teeth 42 into engagement with drive teeth 72 to establish the torque-transmitting connection. Cap-advancing torque transmitted to ratchet wheel 40 is further transmitted to housing 12 by engagement of drive faces 50 on ratchet wheel 40 and driven faces 34 on upper portion 14 of housing 12.

As the operator continues to apply torque in cap-advancing direction 76, internal threads 18 of housing 12 interlock with the grooves formed on filler neck 20 so that cap 10 advances to a tight seated position on filler neck 20 in which annular gasket 30 is trapped between the top edge of the filler neck 20 and the underside 26 of spring support shelf 24 to establish a seal between the cap 10 and the filler neck 20 as shown in FIG. 2.

Advantageously, cap 10 is designed to accommodate additional cap-advancing torque which an operator might inadvertently or deliberately apply. When cap 10 is advanced to a tight seated position such as that shown in FIG. 2, housing 12 is no longer able to rotate with respect to filler neck 20. Thus, cap-advancing torque applied to outer shell 58 and transmitted to ratchet wheel 40 in the above-described manner cannot be further transmitted to housing 12. Therefore, each additional increment of cap-advancing torque applied to outer shell 58 translates to an additional increment of engaging force applied by drive teeth 72 to driven teeth 42. Since the torque cannot be translated into rotational motion, it builds up in outer shell 58 to the point at which the torque overcomes the frictional forces between drive teeth 72 and driven teeth 42. Drive teeth 72 therefore move relative to driven teeth 42 out of interdental pockets 56 along inclined faces 52.

Owing to the relative angles of inclined faces 74, 52 of drive teeth 72 and driven teeth 42, respectively, the movement of drive teeth 72 relative to driven teeth 42 biases ratchet wheel 40 axially downwardly. Continued application of torque will cause each drive tooth 72 to move from its original interdental pocket 56 to the adjacent interdental pocket, at which point wavy spring 38 will bias ratchet wheel 40 axially upward so that each interdental pocket 56 is presented for driving engagement with an adjacent drive tooth 72.

If additional cap-advancing torque is applied to outer shell 58, drive teeth 72 will continue to move relative to driven teeth 42 as above described with a characteristic "clicking" noise. That is, outer shell will essentially rotate freely with respect to ratchet wheel 40 and will thus absorb excess torque while maintaining housing 12 and ratchet wheel 40 intact.

In removal of cap 10, drive teeth 72 engage driven teeth 42 to provide a positive drive connection between the ratchet wheel 40 and the outer shell 58. As shown in FIG. 3, when torque is applied to outer shell 58 to rotate cap 10 in a cap-removal direction represented by arrow 78, the torque is transmitted to ratchet wheel 40 by way of the engagement of upright faces 75 of drive teeth 72 against upright faces 54 of driven teeth 42. Since it is not necessary to accommodate excess torque in cap removal, upright faces 54 and 75 can be provided for the torque-transmitting connection rather than angled faces 52 and 74 as are provided to establish the cap-advancing connection.

Cap removal otherwise occurs in a manner similar to cap installation. Cap-removing torque is transmitted from the outer shell 58 to ratchet wheel 40 by upright face 75 bearing against upright face 54. Drive faces 50 transmit torque to faces 34, causing housing 12 to rotate with respect to filler neck 20 about axis 36 in response to rotation of outer shell 58 about axis 36.

An alternative embodiment of a housing for cap 10 is illustrated in FIG. 4. Those elements referenced by numbers identical to those in FIGS. 1-3 perform the same or similar function. In FIG. 4, a housing member 112 includes an upper portion 14 and a downwardly depending cylindrical portion 116. Cylindrical portion 116 includes external threads 118 designed to interlock with a filler neck (not shown) having internal grooves. An annular O-ring gasket 30 has an inner diameter essentially equal to the outer diameter of cylindrical portion 116 so that annular gasket 30 fits snugly against cylindrical portion 116 and thereby is positioned to provide a vapor and liquid seal between cylindrical portion 116 and a filler neck when cap 10 is advanced in tightened engagement with the filler neck.

Housing 112 is formed to receive wavy spring 38 and ratchet wheel 40 in the manner previously described. In addition, outer shell 58 is retained on housing member 112 as previously described.

Figure 5:
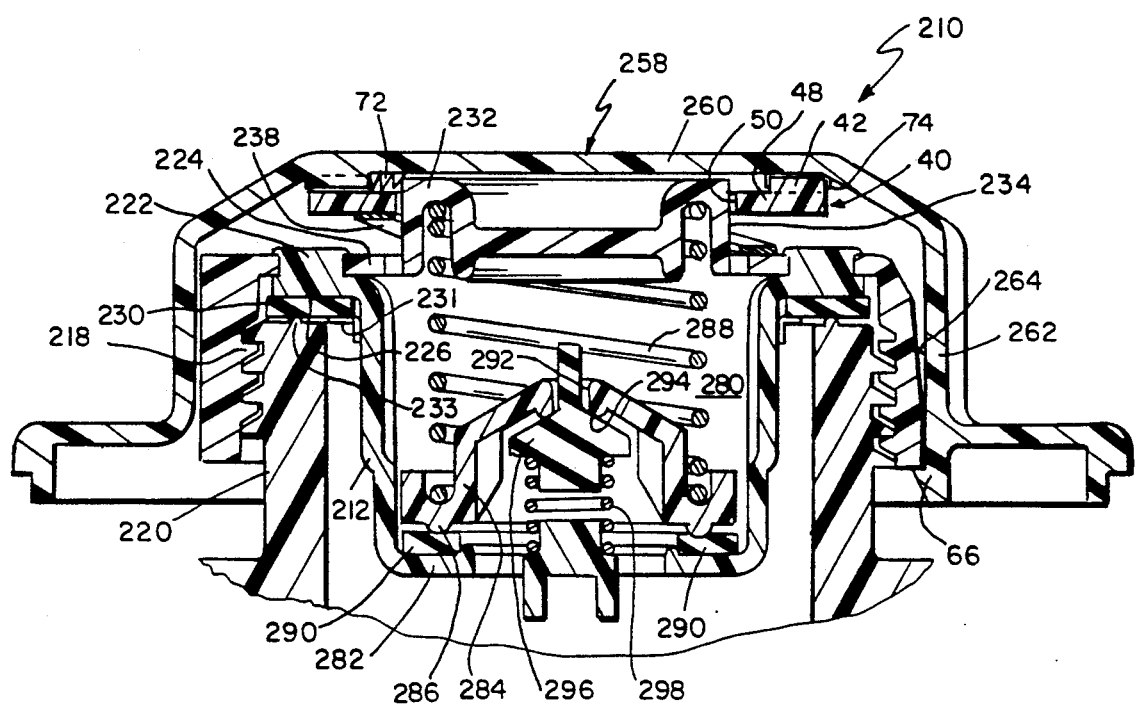
FIG. 5 is a transverse sectional view of yet another embodiment of a torque-override cap in accordance with the present invention having pressure-relief and vacuum-relief valves.

In another embodiment of the invention illustrated in FIG. 5, those elements referenced by numbers identical to those in FIGS. 1-5 perform the same or similar function. In this embodiment, a cap 210 is provided with a housing 212 configured to mount on a filler neck 220 and an outer shell 258 configured to provide a hand grip. Housing 212 has internal threads 218 designed to rotatably engage threads provided on filler neck 220. Housing 212 also includes a spring support shelf 224. Appended to spring support shelf 224 is an upright annular flange 232 having a driven face 234 for receiving torque. Housing 212 is also provided with a circular rim 222 having a axially downwardly directed face 226. Abutting the face 226 is an O-ring gasket 230 which is retained against face 226 by gasket retainer 231. When cap 210 is rotated into a tight seated position on filler neck 220, gasket 230 engages an annular valve seat 233 on filler neck 220 to establish a vapor and liquid seal between cap 210 and filler neck 220.

Cap 210 is provided with a wavy spring 238 which is received on spring support shelf 224. Wavy spring 238 in turn supports a ratchet wheel 40 for axial movement relative to housing 212 so that ratchet wheel 40 is free to engage or disengage the ring of drive teeth 72 provided on the underside of the outer shell 258 during installation and removal of the cap 210 on the filler neck 220. In the illustrated embodiment, drive faces 50 of D-shaped flanges 48 transmit torque to driven face 234 in response to rotation of ratchet wheel 40.

Outer shell 258 has a radially extending portion 260 and an axially downwardly-extending skirt 262. Skirt 262 includes a radially inwardly-directed face 264. Appended to face 264 is a plurality of circumferentially spaced, radially inwardly extending retainer flanges 66 by which shell 258 is retained on housing 212.

Radially extending portion 260 of shell 258 has an axially downwardly directed face 270 on which is appended a plurality of drive teeth 72. Drive teeth 72 engage driven teeth 42 to provide a drive connection which is torque-limited in a cap-advancing direction and positive in a cap-removal direction.

In the illustrated embodiment, housing 212 is also formed to include a chamber 280 having a bottom wall 282. A pressure-relief valve 284 is disposed in chamber 280. Pressure-relief valve 284 includes an annular ridge 286 and is biased by a spring 288 so that annular ridge 286 is placed into sealing engagement with an annular gasket 290 disposed on bottom wall 282 of chamber 280. At high tank pressures, pressure-relief valve 284 moves in opposition to spring 288, breaking the vapor seal between ridge 286 and gasket 290 and allowing escape of vapor from the tank.

Pressure-relief valve 284 is also formed to include an aperture 292. An annular ridge 294 is described about the circumference of aperture opening 292 and defines a valve seat. A vacuum valve 296 is biased by a spring 298 into vapor-sealing engagement with annular ridge 294 so that vacuum valve 296 normally prevents vapor from escaping through aperture 292. At tank pressures below a predetermined level, vacuum valve 296 moves in opposition to spring 298 to break the vapor seal between ridge 294 and vacuum valve 296 to allow the pressure in the tank to equalize with the pressure in chamber 280.

Although the invention has been described in detail with reference to certain preferred embodiments, variations and modifications exist within the scope and spirit of the invention as described and defined in the following claims.

What is claimed is:

1. A cap for use in a filler neck of a tank, the cap comprising
   a housing including means for engaging the filler neck,
   shell means for providing a hand grip, the shell means including a plurality of drive teeth,
   a ratchet wheel disposed between the housing and the shell means and connected to the housing for rotation therewith, the ratchet wheel including a plurality of driven teeth configured to engage the drive teeth to provide a torque-limited connection in the cap-advancing direction and a positive connection in the cap-removal direction, and
   spring means for yieldably biasing the driven teeth of the ratchet wheel into engagement with the drive teeth of the shell means to establish said torque-limited and positive connections, the spring means being separate from the ratchet wheel.

2. The cap of claim 1, wherein the shell means includes a predetermined number of drive teeth and the ratchet wheel includes an equivalent number of driven teeth.

3. The cap of claim 1, wherein the spring means is disposed between the housing and the ratchet wheel.

4. The cap of claim 1, wherein the spring means includes an annular ring.

5. The cap of claim 1, wherein the spring means includes an undulating ring.

6. The cap of claim 1, wherein the housing is configured to rotate with respect to the filler neck about an axis of rotation and the spring means acts along the axis of rotation.

7. The cap of claim 1, wherein the housing includes at least one axially extending flange positioned to receive torque from the ratchet wheel, an axially extending circular rim, and a radially extending shelf appended to the rim, the at least one flange cooperates with the rim to define a space therebetween, and the spring means is situated in the space.

8. The cap of claim 1, wherein the ratchet wheel includes a circular ring having the plurality of driven teeth.

9. The cap of claim 8, wherein the circular ring has at least three driven teeth.

10. The cap of claim 1, wherein the shell means includes at least three drive teeth.

11. The cap of claim 10, wherein the shell means includes a perimeter edge and the at least three drive teeth are situated at the perimeter edge.

12. The cap of claim 1, wherein the ratchet wheel includes at least twenty driven teeth.

13. The cap of claim 12, wherein the shell means includes at least twenty drive teeth.

14. A cap for use in a filler neck of a tank, the cap comprising
   a housing including means for engaging the filler neck,
   shell means for providing a hand grip, the shell means including a plurality of drive teeth,
   a ratchet wheel disposed between the housing and the shell means and connected to the housing for rotation therewith, the ratchet wheel including a plurality of driven teeth configured to engage the drive teeth to provide a torque-limited connection in the cap-advancing direction and a positive connection in the cap-removal direction, and
   spring means for yieldably biasing the driven teeth of the ratchet wheel into engagement with the drive teeth of the shell means to establish said torque-limited and positive connections, the housing including a pair of spaced-apart axially extending flanges positioned substantially parallel to one another.

15. A cap for use in a filler neck of a tank, the cap comprising
   a housing including means for engaging the filler neck,
   shell means for providing a hand grip, the shell means including a plurality of drive teeth,
   a ratchet wheel disposed between the housing and the shell means and connected to the housing for rotation therewith, the ratchet wheel including a plurality of driven teeth configured to engage the drive teeth to provide a torque-limited connection in the cap-advancing direction and a positive connection in the cap-removal direction, and
   spring means for yieldably biasing the driven teeth of the ratchet wheel into engagement with the drive teeth of the shell means to establish said torque-limited and positive connections, the housing including at least one driven flange, the ratchet wheel including a circular ring formed to include the plurality of driven teeth, and at least one drive flange being appended to an inner wall of the circular ring and oriented to project in a radially inwardly extending direction to engage the at least one driven flange to establish a connection between the ratchet wheel and the housing for rotation.

16. The cap of claim 15, wherein the at least one drive flange is D-shaped.

17. The cap of claim 15, wherein the circular ring includes a pair of drive flanges positioned in spaced-apart, substantially parallel relation.

18. A cap for use in a filler neck of a tank, the cap comprising
a housing including means for engaging the filler neck,
shell means for providing a hand grip, the shell means including a plurality of drive teeth,
a ratchet wheel disposed between the housing and the shell means and connected to the housing for rotation therewith, the ratchet wheel including a plurality of driven teeth configured to engage the drive teeth to provide a torque-limited connection in the cap-advancing direction and a positive connection in the cap-removal direction,
spring means for yieldably biasing the driven teeth of the ratchet wheel into engagement with the drive teeth of the shell means to establish said torque-limited and positive connections, and
a sealing gasket, the housing including a radially extending wall having an axially downwardly facing side abutting the sealing gasket so that the sealing gasket engages the filler neck upon tightened engagement of the housing on the filler neck and an axially upwardly facing side, and at least one axially extending flange being appended to the axially upwardly facing side and positioned to receive driving torque from the ratchet wheel.

19. A cap for use in the filler neck of a tank, the cap comprising
a housing including first engaging means for rotatably engaging the filler neck and second engaging means,
a shell providing a hand grip, the shell including third engaging means,
means for establishing a driving connection between the shell and the housing so that upon engagement of the housing and said filler neck the shell is rotatable relative to said filler neck about an axis of rotation to rotate the housing on said filler neck in one of the cap-advancing and cap-removal directions, the establishing means including a ratchet wheel disposed for rotation between the shell and the housing, the ratchet wheel including fourth engaging means for engaging the second engaging means of the housing to provide a driving connection between the housing and the ratchet wheel which is positive in both of a cap-advancing direction and a cap-removal direction and fifth engaging means for engaging the third engaging means of the shell to provide a driving connection between the ratchet wheel and the shell which is torque-limited in the cap-advancing direction and positive in the cap-removal direction, the establishing means further including spring means for yieldably biasing the ratchet wheel to urge the fifth engaging means of the ratchet wheel into engagement with the third engaging means of the shell without disengaging the fourth engaging means of the ratchet wheel and the second engaging means of the housing.

20. The cap of claim 19, wherein the spring means acts between the housing and the ratchet wheel.

21. The cap of claim 19, wherein the shell rotatably engages the housing for rotation about an axis of rotation extending through the housing, the shell further includes flange means for contacting the housing to limit axial movement of the shell relative to the housing along the axis of rotation during rotation of the shell relative to the housing, and the spring means yieldably urges the ratchet wheel in an axial direction substantially parallel to the axis of rotation to bias the fifth engaging means of the ratchet wheel into engagement with the third engaging means of the shell.

22. The cap of claim 21, wherein the spring means acts between the housing and the ratchet wheel.

23. A cap for use in the filler neck of a tank, the cap comprising
a housing including first engaging means for rotatably engaging the filler neck and second engaging means,
a shell providing a hand grip, the shell including third engaging means,
means for establishing a driving connection between the shell and the housing so that upon engagement of the housing and said filler neck the shell is rotatable relative to said filler neck about an axis of rotation to rotate the housing on said filler neck in one of the cap-advancing and cap-removal directions, the establishing means including a ratchet wheel disposed for rotation between the shell and the housing, the ratchet wheel including fourth engaging means for engaging the second engaging means of the housing to provide a driving connection between the housing and the ratchet wheel which is positive in both of a cap-advancing direction and a cap-removal direction and fifth engaging means for engaging the third engaging means of the shell to provide a driving connection between the ratchet wheel and the shell which is torque-limited in the cap-advancing direction and positive in the cap-removal direction, and
a sealing gasket, the housing including an axially inner portion and an axially outer portion, the axially inner portion being formed to include the first engaging means to permit the housing to be mounted on said filler neck, the axially outer portion including means for supporting the gasket on the housing so that the sealing gasket engages the filler neck upon tightened engagement of the housing and the filler neck, and the second engaging means of the housing including at least one driven flange appended to the supporting means.

24. The cap of claim 23, wherein the supporting means includes a radially extending wall having an axially downwardly facing side abutting the sealing gasket and an axially upwardly facing side and the at least one driven flange is appended to the axially upwardly facing side and projects in an axially upwardly extending direction away from the radially extending wall.

25. The cap of claim 24, wherein the ratchet wheel includes a circular ring formed to include the fifth engaging means and at least one drive flange formed to include the fourth engaging means and the at least one drive flange is appended to an inner wall of the circular ring and oriented to project in a radially inwardly extending direction to engage the at least one driven flange and thereby establish the driving connection between the housing and the ratchet wheel.

26. The cap of claim 23, wherein the shell includes a top wall having an underside facing the ratchet wheel and a peripherally and axially extending skirt depending from the top wall and means for coupling the shell to the axially outer portion so that the shell is manually rotatable relative to the housing, the ratchet wheel includes a plurality of inclined ratchet teeth extending in an axially upward direction toward the underside of the top wall, the top wall includes a plurality of inclined drive teeth extending in an axially downward direction and spring means for yieldably urging the ratchet wheel in an axially upwardly extending direction toward the underside of the top wall to intermesh the inclined ratchet teeth of the ratchet wheel and the drive teeth of the shell.

27. The cap of claim 26, wherein the ratchet wheel includes a predetermined number of inclined ratchet teeth and the top wall includes an equivalent number of inclined drive teeth.

28. A cap for use in the filler neck of a tank, the cap comprising
first engaging means for engaging the filler neck,
a shell including second engaging means, the second engaging means being formed of a rigid material,
drive means disposed between the shell and the first engaging means for providing a drive connection between the shell and the first engaging means that is torque-limiting in a cap-advancing direction and is positive in a cap-removal direction, the drive means including third means for engaging the second engaging means, the third engaging means being formed of a rigid material, and
spring means for yieldably biasing the third engaging means into engagement with the second engaging means, the spring means being separate from the drive means.

29. The cap of claim 28, wherein the third engaging means includes a predetermined number of ratchet teeth and the second engaging means includes a corresponding number of drive teeth.

* * * * *